Oct. 2, 1951  F. M. CARROLL  2,569,798
CARTRIDGE FEEDING DEVICE
Filed July 7, 1942  7 Sheets-Sheet 1

FIG.1.

INVENTOR.
Fred M. Carroll
BY
ATTORNEY

Oct. 2, 1951  F. M. CARROLL  2,569,798
CARTRIDGE FEEDING DEVICE
Filed July 7, 1942  7 Sheets-Sheet 2

INVENTOR.
Fred M. Carroll
BY
ATTORNEY.

Oct. 2, 1951    F. M. CARROLL    2,569,798
CARTRIDGE FEEDING DEVICE
Filed July 7, 1942    7 Sheets-Sheet 3

INVENTOR.
Fred M. Carroll
BY
ATTORNEY.

Oct. 2, 1951   F. M. CARROLL   2,569,798
CARTRIDGE FEEDING DEVICE
Filed July 7, 1942   7 Sheets-Sheet 7

INVENTOR.
Fred M. Carroll
ATTORNEY.

Patented Oct. 2, 1951

2,569,798

UNITED STATES PATENT OFFICE 2,569,798

CARTRIDGE FEEDING DEVICE

Fred M. Carroll, Binghamton, N. Y., assignor to International Business Machines Corporation, New York, N. Y., a corporation of New York Application July 7, 1942, Serial No. 450,032

5 Claims. (Cl. 89—33)

The purpose of this invention is to afford a constant and certain supply of ammunition to an automatic gun in action.

The ordinary 30 or 50 calibre machine gun is supplied with ammunition by a belt carrying the rounds in loops. The belt may be stacked in a box or spread out in the open. The action of the average machine gun is, of course, of intermittent character and the belt is advanced by jerks which sometimes, if the belt is laid out straight, may develop such a stress as to jam the gun.

It is a distinct object of this invention to reduce as far as possible the stresses incident to the feeding of ammunition to the gun. In accordance with this object the principal part of the ammunition which is being fed toward the gun is kept in motion continuously at a fairly uniform rate, only a small number of rounds near the breech of the gun taking part in the intermittent motion characterizing the feed of the rounds into the firing chamber. This object is realized by a mechanism including a regulating and accelerating device, which not only equalizes the continuous feed from the magazine with the intermittent feed into the gun; but also accelerates the small number of rounds nearest the breech of the gun, when the bolt springs forward, to assure the arrival of the next round in ready position, in time to be picked up by the bolt on its next charging movement.

A further object of the invention is to provide an ammunition feeder of the kind described in which the continuous motion of the ammunition toward the gun is derived from a feeding device operated by the intermittent recoil motion of the gun.

A further object is to provide an ammunition feeder of the kind last described, wherein the load imposed upon the gun by the feeder is free from sudden and large variations.

A further object of the invention is to provide an ammunition feeding device which will perform reliably with automatic guns of larger calibre than the ordinary machine gun, such as 20 mm. guns or larger.

A still further object of the invention is to provide an ammunition feeding device for an automatic gun which is normally operated by the counter recoil of the gun, but which has a convenient auxiliary operating means for setting it in action, either preparatory to beginning fire, or in the event of a misfire.

Still another object of the invention is to provide a box of ammunition which can be readily placed in position to serve as the magazine of an automatic gun, with a minimum loss of time.

Other objects of the invention will be pointed out in the following description and claims and illustrated in the accompanying drawings, which disclose, by way of example, the principle of the invention and the best mode, which has been contemplated, of applying that principle.

In the drawings:

Fig. 12 is a plan view of the reeling mechanism.

Fig. 13 is a transverse section of the reel.

Fig. 14 is a detail sectional view of the auxiliary reel operating mechanism.

Figure 1:
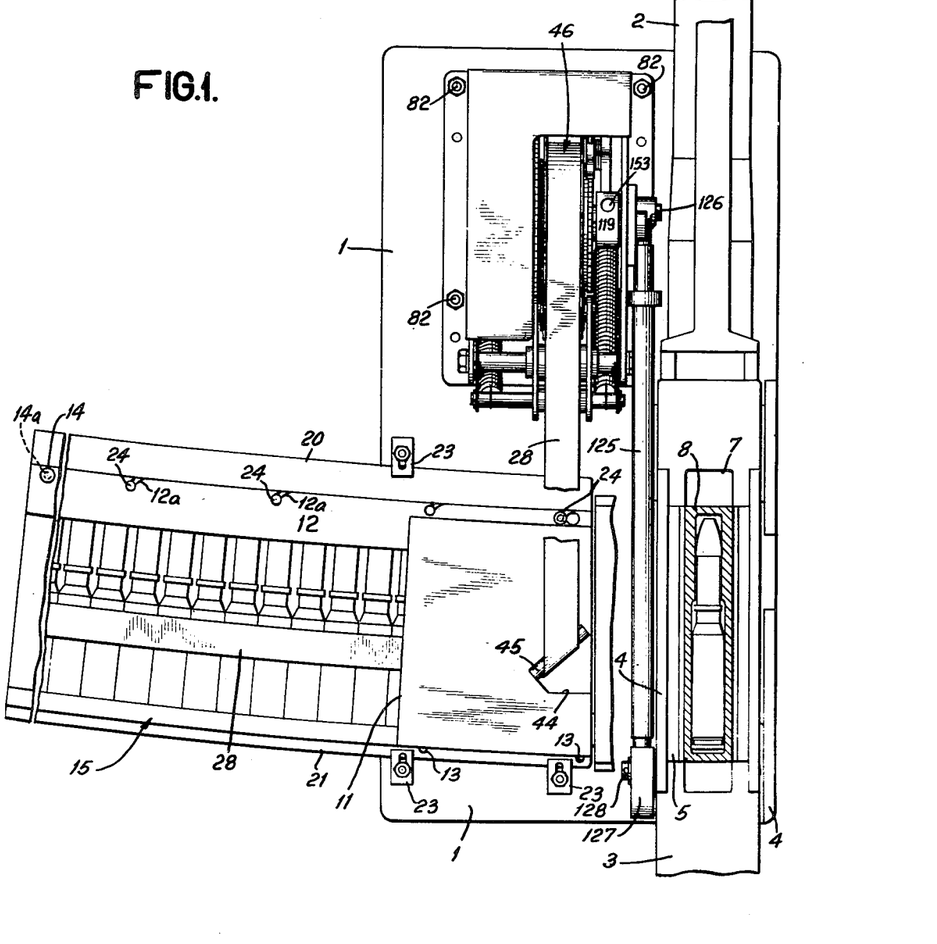
Fig. 1 is a plan view, with parts in section, of a portion of an automatic gun and ammunition feeding means in accordance with the invention assembled therewith.
Figure 2:
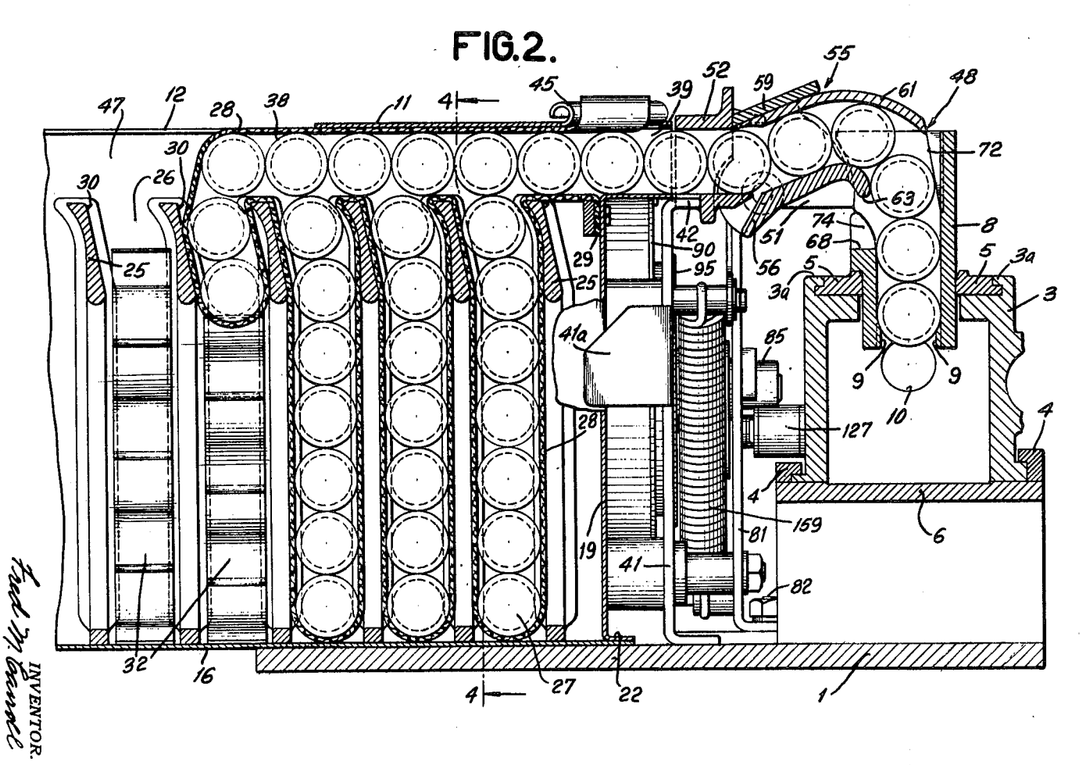
Fig. 2 is a vertical sectional view through the breech of the gun and a portion of the magazine.
Figure 3:
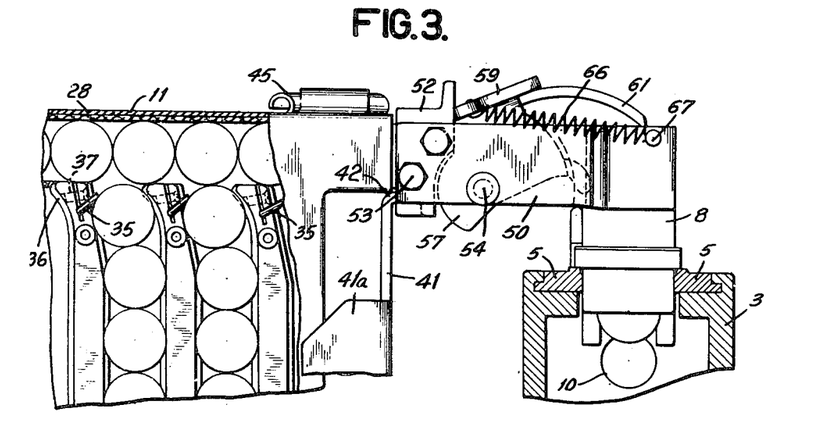
Fig. 3 is a detail elevational view, with parts in section, of portions of the gun and magazine interconnected by a bridge channel comprising a feed regulating mechanism.

Referring first to Figs. 1 and 2, the invention is shown as applied to a standard 20 mm. automatic gun of the M-2 type. A base plate 1 is adapted to be mounted on a suitable foundation to provide for training and elevating the gun, the foundation being entirely omitted from the drawing. The drawing shows a portion of the barrel 2 of the gun and a portion of the gun frame 3. The latter is mounted to slide in guides 4 fixed to a bolster block 6 of the base plate 1. The gun frame 3 has a longitudinal slot 7, into which projects a throat piece 8 fixed upon a slide 5, which has sliding engagement with flanges 3a of the gun frame and is held stationary by means referred to later. The cartridges are fed into this throat piece by means to be described presently, the leading cartridge being held in a ready position by flanges 9 of the throat piece, whence it is moved by the loading mechanism into the firing chamber 10, by the automatic operation of the gun. The loading mechanism does not appear in the drawing. All the structure so far described is that of a standard 20 mm. automatic gun, which is not modified in any respect for the purpose of the present invention.

Figures 4, 5:
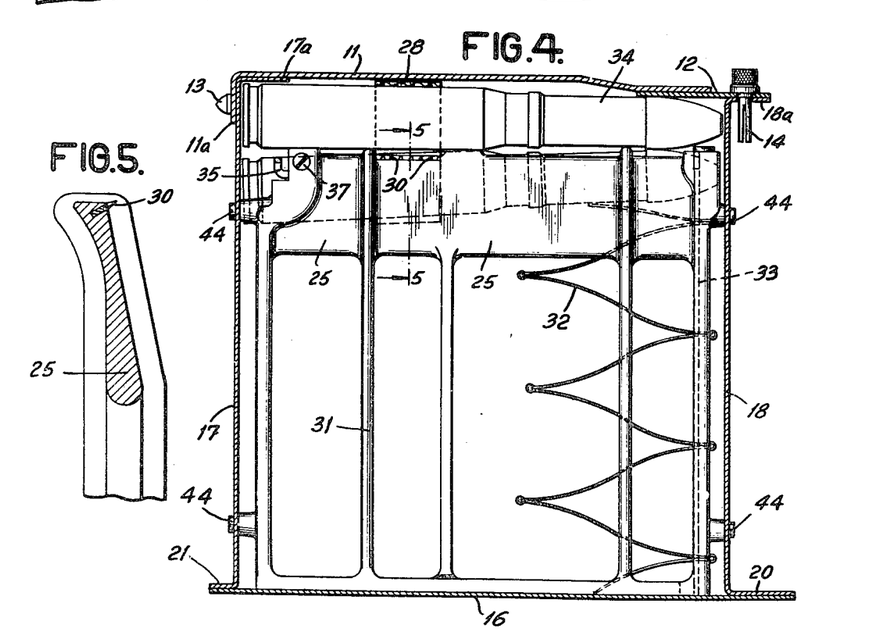
Fig. 4 is a vertical transverse section of the magazine, on the line 4—4 of Fig. 2.
Fig. 5 is a section on the line 5—5 of Fig. 4.

The ammunition is supplied from a magazine 15, which also constitutes the shipping box. The magazine comprises a casing formed of a bottom plate 16, side plates 17 and 18 (Fig. 4), and two end plates, only the right end plate 19 appearing in the drawing. The casing has bottom flanges 20, 21 and 22 by which it is secured to the base plate 1 by means of clamps 23. A bracket 41 riveted to the base plate 1 has ears 41a to engage the side of the magazine, to aid in locating it on the base plate. The top of the side plate 17 is bent inward to form a flange 17a, while the top of side plate 18 is bent outward to form a flange 18a. A cover plate comprising an end section 11 and side section 12 welded together, completes the casing. The end section has a down turned flap 11a, perforated to hook over pins 13 on the side plate 17. The side section 12 of the cover plate rests upon the flange 18a and its outer edge has notches 12a which slip under the heads of rivets 24 fixed upon the flange 18a, as the cover is placed in position. The side section 12 is provided with a hole 14a registering with a hole in the flange 18a, through which a cotter-pin 14 is inserted to secure the cover.

The inner space of the magazine is subdivided by partitions or separators 25 into compartments 26, each wide enough to hold a single stack of cartridges 27. The partitions are secured to the side plates 17 and 18 by machine screws 44. A flexible feeding device 28, which is shown as a canvas belt, has one end secured at 29 to the end wall 19 of the magazine and is looped down into the successive compartments 26, under the stacks of cartridges contained in them. In packing the magazine, after removing the cover 11, 12, the belt 28 is first formed into a small loop extending down into the first compartment 26 at the right, then a cartridge is laid in this loop and pushed down into the compartment far enough to allow a second cartridge to be laid upon it. The cartridges are thus placed in the compartment successively, forcing the belt down further each time, until the compartment is filled, whereupon a second loop is started into the second compartment and the operation repeated. For a reason which will be explained presently there is provided on the top of each partition 25 a row of teeth 30 extending across the width of the belt 28. In packing, the belt is held toward the right clear of these teeth, as shown in Fig. 2, in the compartment containing only two cartridges. The partitions 25 have ribs 31 thereon to guide the cartridges. Each compartment also contains a spring 32 comprising a plurality of leaves threaded upon a wire 33 so as to move freely up and down. The spring is positioned under the bullet end 34 of the cartridges and is pressed down to the bottom of the compartment as the cartridges are laid in. The purpose of the spring is to balance the greater weight of the bullet end of the cartridges so that they will feed upward in the compartment without jamming.

As each compartment is filled to the level of the tops of the partitions, a bent wire retainer 35, frictionally held in jaws 36 at the top of the partition, is turned down against the top cartridge. The jaws 36 are pressed together by a screw 37 to secure the proper degree of friction upon the retainer 35, so that the latter will hold the cartridges down, until the strong pull of the belt, as described presently, lifts the stack of cartridges in the particular compartment and deflects the retainer to ineffective position. When all the compartments are filled to the level of the tops of the partitions, cartridges are placed in a single layer 38 over the top of the partitions and stacks of cartridges. Then the cover 11, 12 is laid on and secured by the cotter-pin 14. The space in which the top layer of cartridges is held is limited at the top by the flange 17a on the side plate 17 and the side section 12 of the cover. The space thus enclosed will be seen to constitute a passage 47 communicating in the manner of a header with the compartments 26. The header passage 47 leads to a discharge opening 39 at the end of the magazine nearest the gun. The belt 28 passes from the outer side of the last compartment to the left, over the top of the layer of cartridges 38, and is bent sharply around a curved guide 45 bordering an aperture 44 in the cover section 11, to a reeling mechanism indicated generally at 46 in Fig. 1. When the belt is pulled by the reeling mechanism in a manner to be described later, the stack of cartridges in the compartment 26 at the left end of the magazine, in Fig. 2, is first raised, and the cartridges in the passageway 47 are simultaneously pressed to the right through the opening 39. The teeth 30 on the partition 25 at the right side of the left end compartment 26 prevent the belt from slipping over the top of this partition, thereby confining the feeding action for the moment to the single stack of cartridges at the left end of the magazine. When the first compartment is empty, the belt pulls away from the teeth 30 at the top of the partition forming the right side of the compartment just emptied, and the pull is thereupon transferred to the cartridges in the next compartment to the right. The stacks of cartridges are thus fed one by one into and through the passageway 47, until the magazine is empty.

The ammunition fed out of the magazine by the belt 28 passes to the gun through a bridge channel indicated generally at 48 in Fig. 2. This bridge channel serves not only to guide the ammunition to the gun, but also be regulate the feed, and to accelerate a small group of cartridges nearest the gun, each time the loading mechanism operates, to place another cartridge in ready position at the breech immediately, without dependence upon the rate at which the ammunition is moving from the magazine toward the gun. The movement of the cartridges from the throat 8 into the firing chamber 10 is intermittent. The considerable weight of the cartridges in process of movement from the magazine toward the gun at any particular time would offer large resistance to the sudden acceleration which would be necessary, if their feed were to conform to the intermittent operation of the loading mechanism. Furthermore, if it were necessary to accelerate all of the cartridges moving toward the gun, in order to move the penultimate round to ready position, the retarding force might be so great as to cause said round to arrive late and jam the gun. To eliminate the necessity for setting all of these cartridges in motion at each operation of the breech mechanism, the bridge channel is provided with the regulating and accelerating mechanism previously mentioned, which enables the line of cartridges moved toward the gun to continue in motion during the intervals between feed of the cartridges into the firing chamber, and accelerates the last few rounds toward the breech independently of the rest of the rounds.

Figure 6:
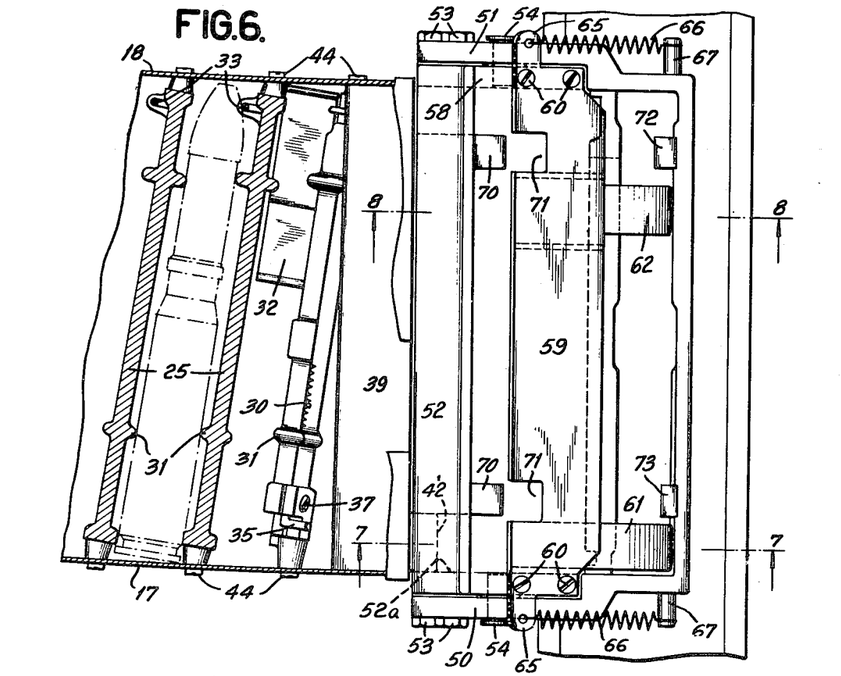
Fig. 6 is a plan view of the bridge channel comprising the feed regulating mechanism, with a portion of the magazine shown in section.
Figure 7:
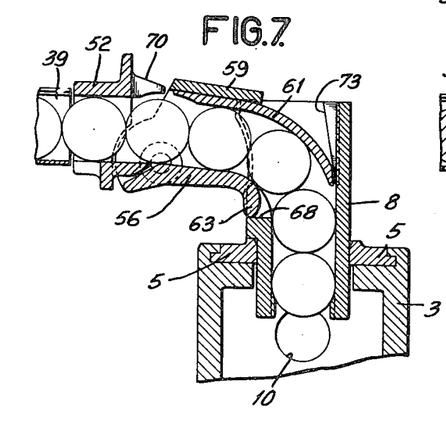
Figs. 7 and 8 are detail sections on the lines 7—7 and 8—8, respectively, of Fig. 6.
Figure 8:
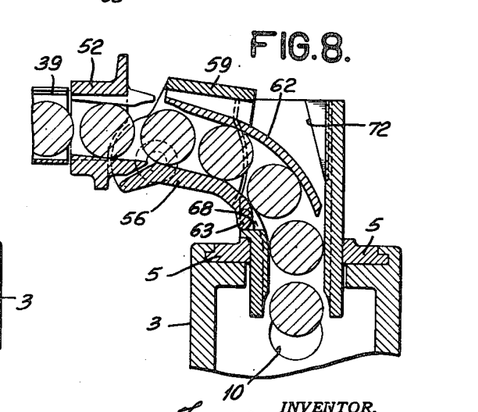
Figure 9:
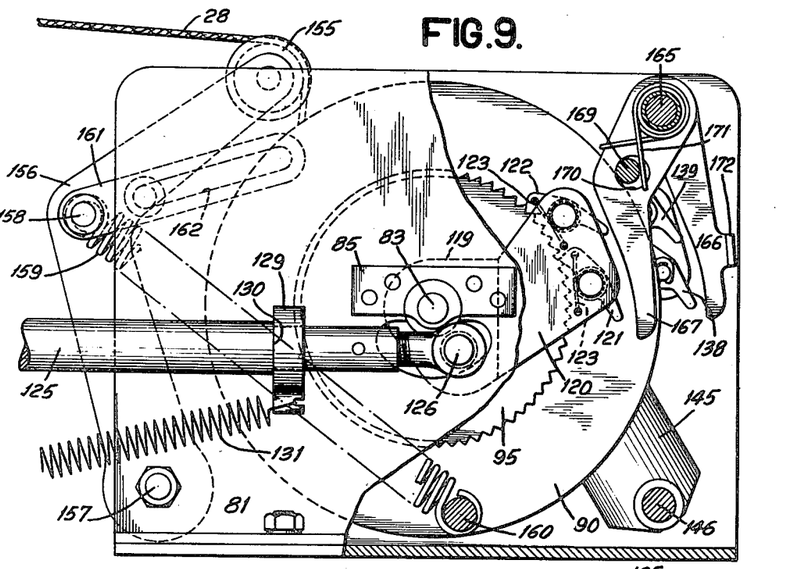
Fig. 9 is a side elevation of the reeling mechanism, with a portion of the side plate broken away.

The throat 8 of the gun is formed with two cheeks 50 and 51 (Fig. 6) between which a mouth piece 52 is fixed by screws 53. Since the throat 8 has a sliding connection with the gun frame 3, means are provided to hold it against longitudinal movement. For this purpose the bracket 41 riveted to the base plate 1 has a lug 42 which engages in a notch 52a of the mouth piece 52. When the magazine is clamped in position on the base plate 1, the aperture of the mouth piece 52 registers with the opening 39 at the right end of the passageway 47. Between the mouth piece 52 and the throat 8 is a rocking regulator element, or accelerator, indicated generally at 55 in Fig. 2. The rocking member comprises a bottom plate 56, two end plates 57 and 58 and a top plate 59 secured to the end plates by screws 60. The end plates 57 and 58 are pivoted to the cheeks 50 and 51 by pins 54, which determine the rocking axis of the accelerator. The top plate 59 has fixed to it guide tongues 61 and 62, the former being adapted to guide the shell end of the cartridges, while the latter guides the bullet end, which accounts for their slight difference in shape and position (see Figs. 7 and 8). The top plate 59 also has two ears 65 to which are attached springs 66 anchored at their opposite ends to pins 67 on the throat 8. The accelerator is thus biased in a clockwise direction, so that downwardly extending lips 63 on the right edge of its bottom plate 56 rest upon a shoulder 68 of the throat 8.

It will be observed that the rocking of the accelerator in counterclockwise direction will increase the length of the path through which the cartridges travel to the throat. The accelerator rocks in response to the feeding pressure of the cartridges and thus equalizes the substantially continuous feed of the cartridges from the magazine, with the intermittent feed of the cartridges from the throat 8 into the firing chamber 10 of the gun. When the bottom round in the throat 8 is pushed forward by the bolt into the firing chamber, the accelerator, which has rocked outward in the interval between loading operations, snaps the next few cartridges downward with a speed considerably greater than that of the cartridges moving from the magazine. The feed of the next round to ready position is thus effected by means operating uniformly and independently of the general movement of ammunition from the magazine. In all positions of the accelerator the cartridges are held in a single line and jamming is thereby avoided. Guide tongues are provided at 70 on the mouth piece 52 to bridge the gap between the mouth piece and the top plate 59 of the rocking member, when the latter is in its inner position. These tongues enter recesses 71 in the top plate 59 as the regulating member rocks to its outer position. Additional guides are placed at 72 and 73 on the throat 8, to direct the cartridges down into the throat when the regulator is in its outer position (see Fig. 2). Tongues 74 on the throat 8 serve to complete the guiding surface at the left side of the throat when the regulator is in its outer position.

Figure 10:
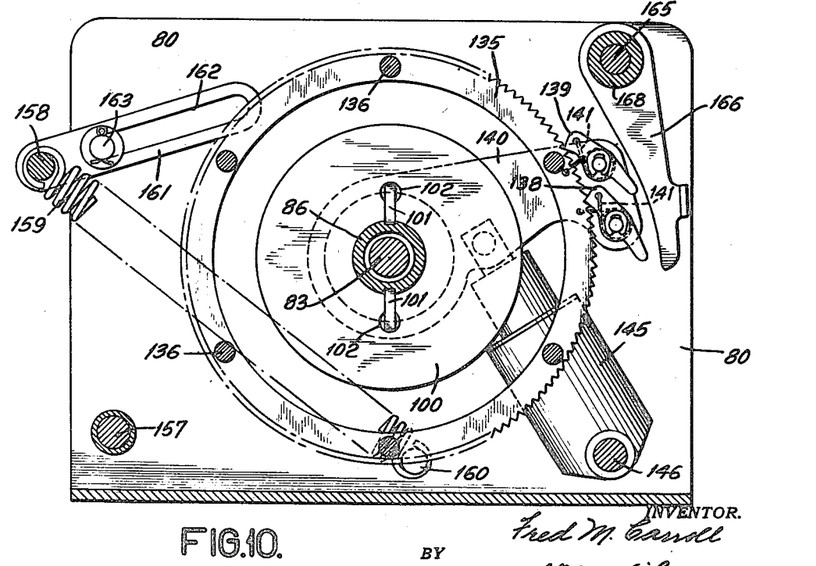
Fig. 10 is a vertical section of the reeling mechanism on the line 10—10 of Fig. 11.
Figure 11:
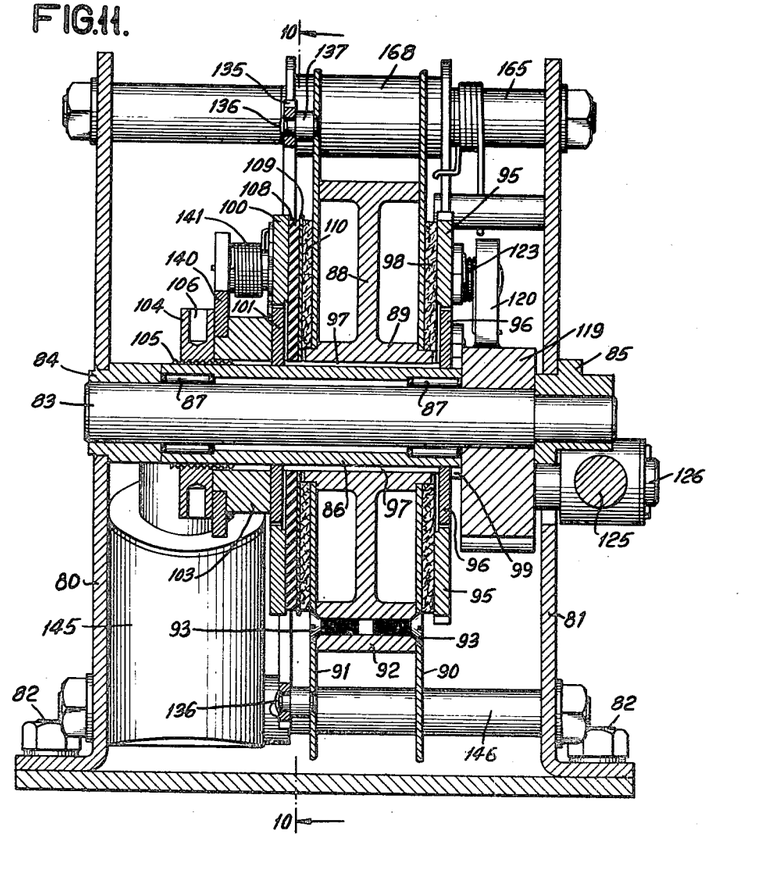
Fig. 11 is a vertical section of the reeling mechanism along the axis of the reel shaft.

The reeling mechanism is mounted in two side plates 80 and 81 (Figs. 9 to 12) secured by bolts 82 to the base plate 1. A stationary shaft 83 is secured by hubs 84 and 85 to the side plates 80 and 81, respectively, and a sleeve 86 is journaled by roller bearings 87 upon the shaft 83. A reel 88, journaled by its hub 89 upon the sleeve 86, has flanges 90, 91 secured to the rim 92 of the reel by screws 93. At the right side of the flange 90 there is mounted upon the sleeve 86 a ratchet disk 95. This disk is keyed to the sleeve 86 by keys 96 engaging in slots of the disk 95 and in key slots 97 of the sleeve 86. Between the ratchet disk 95 and the flange 90 is a felt friction disk 98. Outside of the disk 95 the sleeve 86 has a flange 99. At the left side of the flange 91 a disk 100 is mounted upon the sleeve 86. This disk is also keyed to the sleeve 86 by keys 101 held in slots 102 of the disk 100 (see Fig. 10). Between the disk 100 and the flange 91 of the reel there is a rubber disk 108, a metal washer 109 and a felt disk 110. A collar 103 is interposed between the disk 100 and a nut 104 engaging threads 105 of the sleeve 86 and having wrench sockets 106. By screwing the nut 104 toward the flange 99 the entire assembly on the sleeve 86 is squeezed together, thereby forming a friction connection between the disks 95 and 100 and the flanges 90 and 91 of the reel. As shown in Fig. 13, the rim 92 of the reel has a recess 115 in which stands a pin 116, around which the belt 28 can be looped to secure it to the reel. The belt is passed under the pin 116 and the end of the belt is then laid in a first layer 117 around the rim 92, so that the second layer 118 will bind upon it.

Means are provided to rotate the disk 95 in a counterclockwise direction (Fig. 9) by the counter recoil motion of the gun. A ratchet plate 120 revolubly mounted by its hub 119 on the shaft 83, carries a pair of pawls 121 and 122 biased by springs 123 against the ratchet teeth of the disk 95. The pawls are spaced from each other around the periphery of the disk 95 by a whole number of teeth plus one-half tooth so that one or the other will engage a tooth of the ratchet wheel. A tubular connecting rod 125 is pivotally connected by a pin 126 to the ratchet plate 120 and its opposite end is formed with a loop 127 engaging a pin 128 on the breech block 3 of the gun. A collar 129 resting against a shoulder 130 of the connecting rod 125 has hooked into it one end of a heavy spring 131, the other end of which is anchored to the base plate 1 at a point which does not appear in the drawing. Upon recoil of the gun, the spring 131 pulls the connecting rod 125 back, the elongated opening in loop 127 relieving the connecting rod of the shock of the recoil. When the connecting rod reaches its back limit position, one or the other of the pawls 121, 122 engages a tooth of the ratchet disk 195 and the counter recoil motion of the gun thrusts the connecting rod forward, turning the disk 95 counterclockwise. The motion is transmitted through the friction connection previously described, to the reel.

Retrograde motion of the reel is prevented by means associated with the left flange 91. A ratchet ring 135 is mounted upon the flange 91 by rivets 136 and spacing washers 137. Two retrograde pawls 138, 139 are pivoted upon a rocking arm 140 and biased against the teeth of ring 135 by springs 141. The arm 140 is rockably mounted upon a shoulder of the collar 103 and held in place by the nut 104. The arm 140 is held in normal position by a hydraulic actuator, comprising a cylinder 145 pivoted on a round bar 146 extending between the side plates 80 and 81, and a piston 147 (Fig. 14) connected by a piston rod 148 and a pin 149 to the arm 140. A spring 150 normally holds the piston at the lower end of the cylinder 145, a screw 151 in the head of the connecting rod 148 abutting upon the floor of the cylinder 145 to stop the arm 140. A screw threaded port 152 in cylinder 145 provides means for connecting to the cylinder, a pipe leading to a source of hydraulic pressure. Thus, the ratchet arm 140 serves as an auxiliary operator for the reel, to be used in starting the winding of the reel, or in continuing the winding upon failure of recoil due to a misfire. The reel can also be turned manually by inserting a bar in a socket 153 (Fig. 12) in the hub 119.

The winding of the reel by the ratchet mechanism is intermittent, but the pull on the belt should be continuous. For this reason the belt is looped over an idler pulley 155 mounted on a rocking frame 156 pivoted on a bolt 157 secured to the side plates of the reel mechanism. At the knee of the rocking frame 156 there is a cross bar 158, upon which the ends of two heavy springs 159 are hooked. These springs are anchored to pins 160 on the side walls 80 and 81. The motion of the frame 156 is limited by two links 161 pivoted on the pin 158 and slotted at 162 to embrace pins 163 upon the side plates 80 and 81. Idler pulley 155 and its rocking frame yield to the tension of the belt, to equalize the tension during intervals between the feeding movements of the ratchet mechanism. The load of the feeding mechanism upon the gun is fairly uniform, at least free from violent fluctuation.

Means are provided to disengage the pawls 121 and 122 and also the pawls 138 and 139, so that the reel can be unwound when the magazine has been emptied. For this purpose there is mounted on a round bar 165 extending between the plates 80 and 81, a rocking frame comprising an arm 166 engageable with the tails of the pawls 138 and 139, an arm 167 engageable with the tails of the pawls 121 and 122, and a hub 168 rigidly connecting the arms 166 and 167. Movement of the rocking frame is limited by a pin 169 riveted on the side plate 81 and extending into a hole 170 of larger diameter in the arm 167. A coil spring 171 has one end biased against the pin 169 and the other against the arm 167, to hold the rocking frame normally out of contact with the pawls. A handle 172 on the arm 166 can be pressed toward the reel to move both arms 166 and 167 against their pawls, to release the reel for reverse rotation.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The combination with an automatic gun having a throat from which cartridges are intermittently fed into the firing chamber of the gun, of a magazine comprising means to guide a series of cartridges to the throat of the gun sideways in single file, said guide means including a curved section adjacent the throat of the gun pivoted on a transverse axis so as to be movable toward the throat of the gun to reduce the length of the path defined by said guide means and outward from the throat of the gun to increase the length of said path, while maintaining a continuous passageway for the cartridges; spring means biasing said pivoted section toward the throat of the gun, and means to press the cartridges through said guide means continuously, said pivoted section being moved outward against the force of said spring biasing means by the cartridges fed by said pressing means during intervals between feed of the cartridges into the firing chamber of the gun, and being moved inward by said spring biasing means each time a cartridge is fed into the firing chamber of the gun.

2. The combination with an automatic gun having a throat at its breech from which the cartridges are withdrawn intermittently by the automatic operation of the gun, of a cartridge feeding means comprising a guideway terminating at said throat, feeding means for pressing the cartridges continuously through said guideway toward said throat, said guideway being formed, in part, by a guiding and regulating portion near said throat movable in response to the feeding pressure of the cartridges in contact therewith, in a direction to elongate the path of the cartridges through said guideway, and resilient means continuously exerting a force upon said guiding and regulating portion, tending to resist the movement of said portion in said direction.

3. The combination with an automatic gun having a throat from which cartridges are intermittently fed into the firing chamber of the gun, of a magazine comprising means to guide a series of cartridges to the throat of the gun sideways in a single file, feed means comprising an impelling device adapted to press the cartridges through said guide means, operating means for said impelling device comprising a ratchet drive mechanism operatively connected to said impelling device, and means whereby said drive mechanism can be connected to a part of the gun having a recoil motion, so as to be intermittently operated thereby, means to equalize the force applied to said impelling device by said drive mechanism, to cause said impelling device to press the series of cartridges constantly forward through said guide means, said guide means including a section adjacent the throat of the gun movably mounted so as to yield in response to the pressure of the cartridges therein, in a direction to expand the capacity of said guide means near said throat, and resilient means constantly exerting a force on said movable section tending to resist the movement thereof in said direction.

4. The combination with an automatic gun having means to hold a cartridge in ready position to be moved into the firing chamber by the loading mechanism of the gun, of means to guide cartridges sideways in single file to said holding means, feed means to press a succession of cartridges continuously through said guide means to said holding means, said guide means including a curved section near said holding means having a telescopic relation to an adjacent section of said guide means, said curved section being movable in response to the pressure of the cartridges to elongate said guide means while maintaining a continuous passageway therethrough, and spring means opposing said movement of said curved section.

5. The combination with an automatic gun having means to hold a cartridge in ready position to be moved into the firing chamber by the loading mechanism of the gun, of a magazine comprising means to guide a disconnected series of mutually abutting cartridges sideways in single file to said holding means, a main feed means adapted to exert a force on a cartridge of said series remote from said holding means, in a direction to press the cartridges of said series between said remote cartridge and said holding means through said guide means toward said holding means and with said force thereby applied to the leading cartridge of said series, and by the transmission of the force through the mutually abutting surfaces of the cartridges of said series between said remote cartridge and said holding means, and auxiliary means mounted adjacent the holding means for continuously applying an additional force to a small number of the cartridges in said guide means nearest said holding means tending to push them toward said holding means.

FRED M. CARROLL.

REFERENCES CITED

The following references are of record in the file of this patent:

UNITED STATES PATENTS

| Number | Name | Date |
|---|---|---|
| 357,110 | Bjerkness | Feb. 8, 1887 |
| 889,243 | Langdon | June 2, 1908 |
| 1,413,694 | Vollmer | Apr. 25, 1922 |
| 1,462,169 | Fritz | July 17, 1923 |
| 1,504,714 | Russell et al. | Aug. 12, 1924 |
| 1,842,446 | Dabrasky | Jan. 26, 1932 |
| 1,869,618 | Reising | Aug. 2, 1932 |
| 1,907,342 | Capell | May 2, 1933 |
| 2,130,722 | Kobe | Sept. 20, 1938 |
| 2,382,715 | Hertel | Aug. 14, 1945 |
| 2,415,413 | Burgess | Feb. 11, 1947 |

FOREIGN PATENTS

| Number | Country | Date |
|---|---|---|
| 79,716 | Austria | Jan. 10, 1920 |
| 638,858 | Germany | Nov. 24, 1936 |
| 690,426 | France | June 17, 1930 |
| 813,999 | France | Mar. 8, 1937 |
| 48,651 | France | Feb. 8, 1938 |
| 487,371 | Great Britain | June 20, 1938 |
| 536,873 | Great Britain | May 30, 1941 |